June 5, 1945.          K. SARAFIAN          2,377,719

WAVE CONTROL

Filed Feb. 25, 1943          3 Sheets-Sheet 1

Inventor
Karl Sarafian
By Blackmore, Spencer & Flint
Attorneys

June 5, 1945. K. SARAFIAN 2,377,719
WAVE CONTROL
Filed Feb. 25, 1943 3 Sheets-Sheet 2

Inventor
Karl Sarafian
By Blackmore, Seymour & Hunt
Attorneys

June 5, 1945.　　　K. SARAFIAN　　　2,377,719
WAVE CONTROL
Filed Feb. 25, 1943　　　3 Sheets-Sheet 3

Inventor
Karl Sarafian
By Bachmor, Spencer & Flint
Attorneys

Patented June 5, 1945

2,377,719

UNITED STATES PATENT OFFICE 2,377,719

WAVE CONTROL

Karl Sarafian, Detroit, Mich., assignor to General Motors Corporation, Detroit, Mich., a corporation of Delaware Application February 25, 1943, Serial No. 477,022

7 Claims. (Cl. 250—27)

This invention relates to control means and more specifically to means for controlling the flow of electrical power from a source to a load. There are many instances in which it is necessary to control accurately the amount and time of application of electrical current to a particular load. As exemplary of such a use, but in nowise limited thereto, are welding means in which it is necessary to apply only a few half cycles of current to the welding electrodes and then to control the amount of current flowing per half cycle, depending upon the particular case.

Control systems have been devised for controlling the amount of current flowing per half cycle to any given load, such, for example, as that disclosed in Patent Number 2,306,428 in the name of Francis G. DaRoza, issued Dec. 29, 1942, owned by a common assignee. However, once that system has been adjusted to allow the passage of a certain amount of current per half cycle, that value remains the same for each energized half cycle until the setting is changed. This is done by manually moving the arcuate position of commutator brushes. There may however be instances in which it is desirable to have each succeeding cycle or half cycle pass slightly more than the preceding half cycle so that there is provided gradually ascending power delivered to the load, or vice-versa, a gradually descending amount or various combinations of the same.

It is therefore an object of my invention to provide control means to cause a gradual increase in power supplied to a load.

It is a further object of my invention to provide control means to cause a gradual decrease in power supplied to a load.

It is a still further object of my invention to provide automatic means to cause a gradual increase or decrease in power supplied to a load.

It is a still further object of my invention to provide control means to automatically control the power passed each successive half cycle in a series to a slightly lower or higher value than in the preceding half cycle.

With these and other objects in view which will become apparent as the specification proceeds, the embodiments of my invention will be best understood by reference to the following specification and claims and the illustrations in the accompanying drawings, in which:

Figure 4:
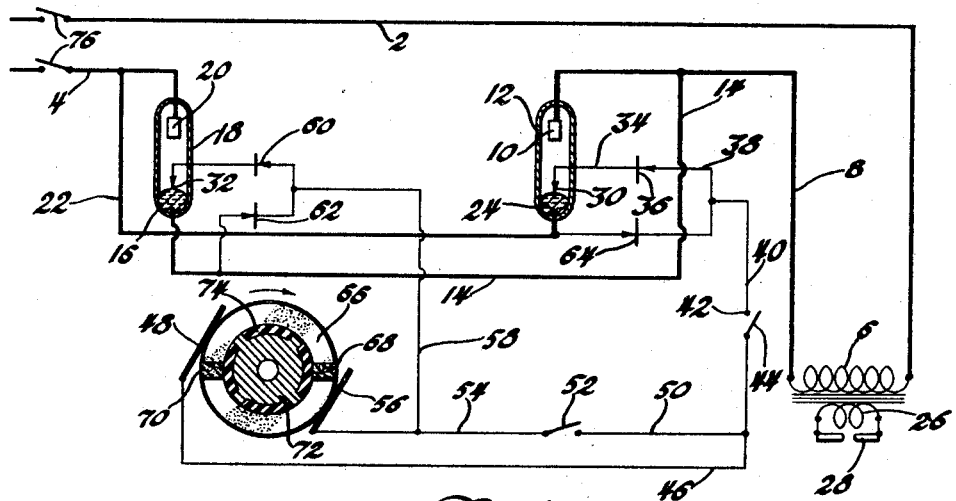
Figure 4 is a schematic wiring diagram of my control system.

Referring first to the wiring diagram shown in Figure 4, there is shown therein a pair of incoming lines 2 and 4 having control switches therein, line 2 being connected directly to primary 6 of a welding transformer, the opposite terminal of which is connected by line 8 to a plate 10 of an ignitron control tube 12 and also through a tapped line 14 to the cathode 16 of a second ignitron tube 18. Line 4 is connected directly to plate 20 of the tube 18 and also through a tapped line 22 to the cathode 24 of the tube 12. Associated with the primary 6 is a secondary 26 across which the actual welding contacts 28 are connected.

Both tubes 12 and 18 are as mentioned above of the ignited type and therefore will not pass current until they have been ignited and for this purpose are provided with igniting electrodes 30 and 32 respectively. Igniting electrode 30 is connected by line 34 to a rectifier 36, the latter being connected by line 38 to line 40 which terminates in a switch contact 42, the movable arm 44 which cooperates therewith being connected through line 46 with a brush 48. Tapped into line 46 is a separate line 50 which extends to a switch 52 and thence on through line 54 to a second brush 56. A tapped line 58 extends from line 54 to a pair of rectifiers 60 and 62 which allow passage of current in opposite directions, rectifier 60 being connected directly to igniting electrode 32 and rectifier 62 being connected to line 14. The fourth rectifier 64 is connected between line 22 and line 40.

Between the two stationary brushes 48 and 56 is a rotating cylindrical member 66 which is diagrammatically shown as having two conducting sections 68 and 70, the remainder of the cylindrical member 66 being non-conducting. Therefore when these two portions are in alignment between the brushes 48 and 56, current may pass if 68 and 70 are conductively connected. However, rotating concentrically within this cylindrical member 66 is an armature member 72 which as shown has four projecting conducting points and also four arcuate sections such as 74 between them of insulating material. Thus current cannot flow between brushes 48 and 56 unless all of these parts are in alignment to permit such flow. This last described apparatus comprises what may be termed a "phase shifting" construction; that is, it provides means whereby the current will be allowed to flow at any point in the half cycle that is desired. It may be the initial point of the half cycle or at any point thereafter. The operation of switch 52 in this circuit also provides a means for short-circuiting this phase shifter and therefore with switch 52 closed a full half cycle will be applied to primary 6 for each energization as applied from the source.

The operation of this circuit is as follows: Assuming that the main line switch 76 is closed and also for the moment that switch 52 is closed, thus cutting out the phase shifter from exerting any control, the synchronously operated timer switch 44 is now closed, and assuming that the line 4 for this particular half cycle is positive with respect to line 2, tube 18 will be in condition to fire; that is, the plate 20 is at a higher potential than the cathode 16 and an igniting current may flow to the igniter electrode 32 through the following circuit: line 4, line 22, rectifier 64, line 40, switch 44, line 50, switch 52, line 54, line 58, rectifier 60, igniter 32, cathode 16, line 14, line 8, primary 6, incoming line 2. Tube 18 will then become conductive and will pass current until the voltage between the anode and the cathode falls below the maintaining voltage, at which time this tube will cease to be conductive and of course during the next half cycle the polarity of the voltage on the lines will reverse and cathode 16 will be at a positive potential with respect to the anode 20 and tube 18 cannot pass current for the next half cycle.

However, during this half cycle tube 12 is now in a condition to pass such current inasmuch as its anode 10 is positive with respect to the cathode 24 because line 2 is now at a higher potential with respect to line 4. Igniting current will flow through igniter electrode 30 through the following circuit: line 2, primary 6, line 8, line 14, rectifier 62, line 58, line 54, switch 52, line 50, switch 44, line 40, line 38, rectifier 36, igniter 30, cathode 24, line 22 to line 4. Tube 12 will then pass the complete half cycle and will as in the previous case become non-conductive upon the voltage on the plate going to zero. The process will be repeated for the next half cycle and it will thus be obvious that the tubes 18 and 12 alternately conduct full half cycles of alternating current to the primary 6 of the welding transformer.

However, if it is now desired to use only a portion of a half cycle of current instead of utilizing the full half cycle per each firing of the tubes, switch 52 is opened. Let us again assume for the moment that the ring 66 with its two conducting oppositely disposed segments does not rotate but is stationary and in alignment with the brushes 56. Then each time that the center commutator 72 rotates 90°, a circuit will be completed therethrough and current will be allowed to flow at that instant. If the instant at which current is allowed to flow is not the instant of current initiation for that half cycle, then that amount of current will be lost which precedes that instant. In other words, suppose that one quarter of this cycle has already passed before the igniter, either 30 or 32, has been energized to allow the tube to fire. Only that amount of current will be passed which remains for that half cycle and by adjusting the point at which the igniting electrode fires we can control the amount of current thus utilized.

However, as previously described, if the intermediate member 66 or brushes are definitely fixed in some arcuate position, the amount of current cut off per each half cycle must of necessity remain the same until it is physically moved to some other arcuate position. If, however, we can by some adjustable means feed the intermediate member gradually with respect to the commutator, we can obtain each half cycle of slightly larger or smaller size, depending upon which way the relative movement takes place from the preceding half cycle. In other words, if the brushes bear directly upon the commutator 72, then each time that commutator rotates and completes the circuit between the brushes, the igniting circuit will be complete. If, however, we interpose a movable means that will slip around the periphery of the commutator at some predetermined slower speed and connect these by slip rings to take-off brushes, then we can gradually cut down or increase the size of each succeeding half cycle and thus provide a gradually increasing or decreasing amount of energy applied to the load.

Figure 1:
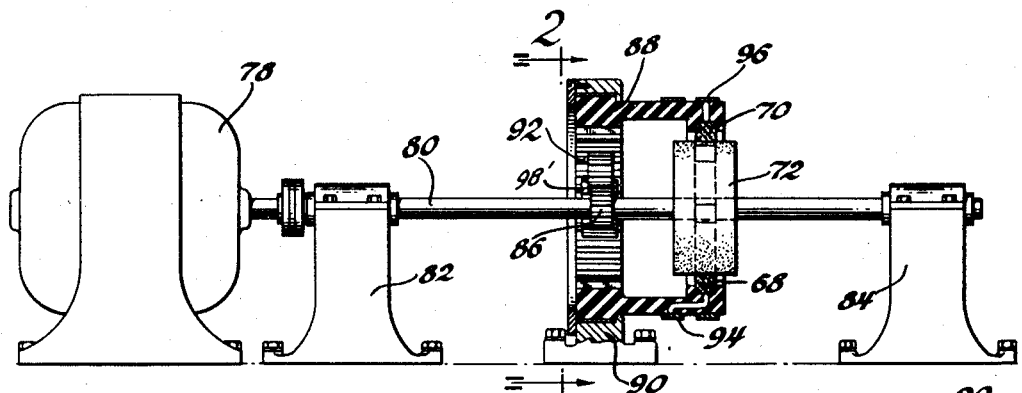
Figure 1 is a side view, partly in section, showing a motor drive and commutator control means used in my invention.
Figure 2:
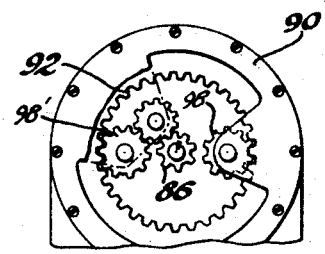
Figure 2 is a sectional view taken on line 2—2 of Figure 1.

One means for doing this is disclosed in Figure 1 in which there is shown a small driving motor 78 which drives a shaft 80 supported in suitable spaced bearing supports 82 and 84. Keyed to the shaft is a small spur gear 86 and in spaced axial relation thereon is a commutator disc 72. Mounted adjacent the spur gear 86 is a cylindrical drum 88 rotatably mounted in support 90 encircling one end of the same and which has internal teeth 92 to engage diametrically disposed idler transfer gear assemblies 98 or 98' which alternatively mesh with the spur gear 86. This cylindrical member 88 is the counter part of the disc 66 in Figure 4 and carries on its axially displaced periphery a pair of slip rings 94 and 96 which slip rings are connected to diametrically opposite brush members 68 and 70 which brush members are adapted to bear against the periphery of the commutator member 72.

It will thus be evident that as the shaft 80 is rotated by the motor 78, the commutator 72 and the cylindrical brush-carrying member will rotate at different speeds depending upon the ratio of the teeth of the spur gear 86 and the internal gear teeth 92. If it is desired to drive the cylindrical member 88 in the opposite direction to the commutator 72, it is only necessary to move the cylindrical housing support 90 a short distance transversely to the axis to bring the spur gear 86 into contact with the other idler gear assembly 98 or 98' which will then drive the gear 92 and thus reverse its direction of rotation. If now the two members 48 and 56 are so located as to bear upon the slip rings 94 and 96, current will be conducted between them at such times as the brushes 68—70 are in alignment with the conducting portions of the commutator 72.

Figure 5:
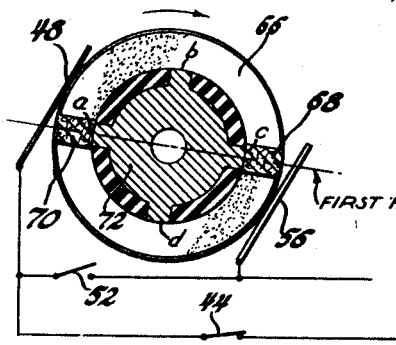
Figures 5, 6, 7 and 8 are diagrammatic representations showing the position of the controlling commutator and brushes at various positions of rotation to control the current flow.
Figure 6:
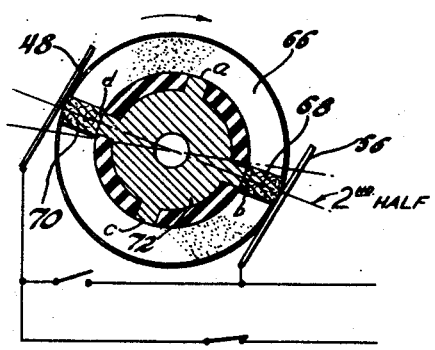
Figure 7:
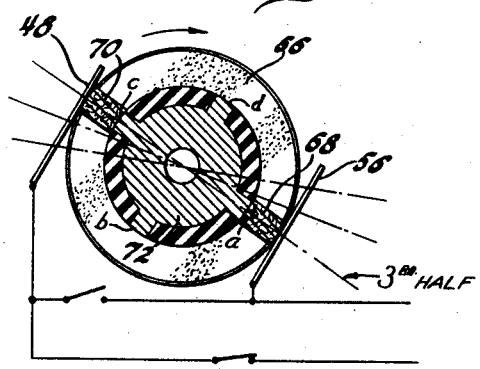
Figure 8:
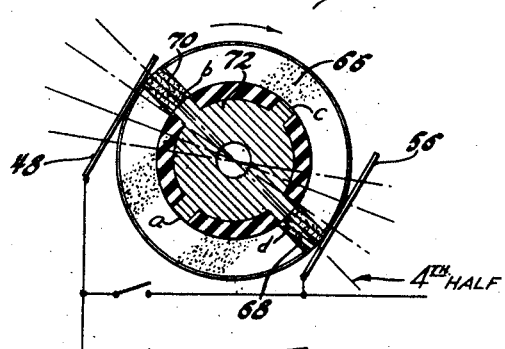

In order to assist in the explanation of the operation of the system providing gradual increase or decrease in the amount of power through this type of phase shifting, reference is hereby made to Figures 5–8 inc. which illustrate the different conductive periods. As shown in Figure 5, the commutator and brush cylinder are both rotating in a clockwise direction as indicated by the arrows and in order to identify the various portions of the commutator the projecting ends have been lettered $a$, $b$, $c$ and $d$. Assuming therefore that for the first half cycle those oppositely disposed conductive portions of the commutator $a$ and $c$ are in alignment with the brushes 68 and 70 and therefore in the position shown in Figure 5, current will be conducted from slip ring contact 48 to 56. This current flow will cause one of the tubes 18 or 12 to fire. As soon however as the ignition circuit is completed and the tube fired, the same is broken inasmuch as the commutator is rotating at a relatively high rate of speed and $a$ and $c$ pass out from beneath brushes 68 and 70.

As the next half cycle approaches, projecting conducting portions $b$ and $d$ of the commutator now are between brushes 70 and 68 and permit conductance therethrough. However, during the time that it required $a$ and $c$ to turn through 90° and bring $b$ and $d$ into alignment, the brushes 68 and 70 have also advanced a short distance in a clockwise direction and therefore inasmuch as the timing of the power circuit has not changed, the tubes 18 or 12 will not become conductive until a later point in the half cycle inasmuch as slightly more than 90 electrical degrees has been utilized for this period due to the movement of the brush-carrying member. This is shown by the difference in the slope of the line drawn through the center of the commutator and the brushes. For the third half cycle the commutator has now rotated 180° so that now projecting portions $c$ and $a$ interconnect the brushes 70 and 68. However here again the brushes themselves have advanced a short distance further as indicated by the additional slope in the line through the center and the tube is not allowed to fire until a still later point. Therefore the third half cycle would be still smaller than the second and Figure 3 lastly shows the condition for the fourth half cycle in which the brushes 70 and 68 have advanced a still additional amount and the tube is prevented from firing until a still later point. If it is desired to have the power per half cycle increase instead of decrease, then the gear drive would be reversed so that the rotation of the brushes would be opposite to that of the rotation of the commutator and then instead of having them fire progressively at a later point, would fire at an earlier instant each time.

Figure 3:
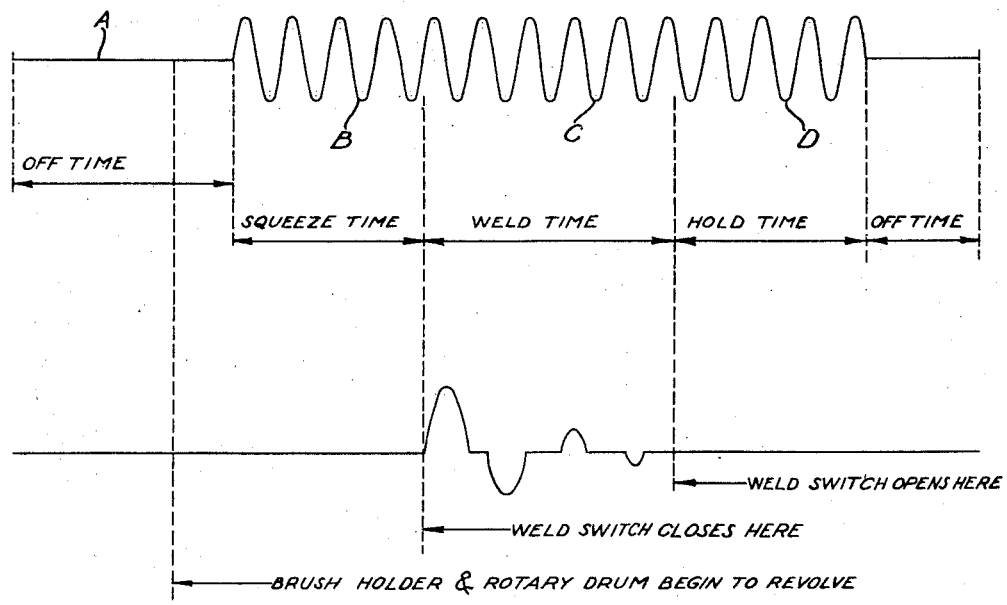
Figure 3 is a graphic representation of the various portions of a complete welding cycle showing the proportions of each part and the power current flow during weld time.

The output current is best shown in Figure 3 in which there is shown diagrammatically a complete welding cycle during which there is a section A at which time the power is entirely off. This is followed by a time period indicated by a plurality of cycles during which time power is applied to various portions of the circuit, that is, the time equivalent to several cycles indicated as B are devoted to the so-called squeeze time, during which time the articles are applied between the electrodes and physically clamped but as yet no welding power has been supplied; secondly, a plurality of cycles indicated at C known as the weld time, during which time electric power is applied and the articles actually fused; and lastly a hold time indicated at D, during which time the metals are maintained under pressure and allowed to harden but the power is discontinued. The lower line in Figure 3 indicates the weld current and of course current only flows through the electrodes during the actual weld time. This is shown as several half cycles and it will be noted that the first half cycle is relatively full size, but thereafter each one in succession is smaller than the preceding one. This is the type of current supplied by the phase shift control as heretofore described and may be found very useful in welding certain materials in which a relatively large amount of current is desirable with a gradual tapering off to prevent hardening cracks. Of course, as previously indicated, this may be a gradually ascending group of half cycles instead of descending.

Figure 9:
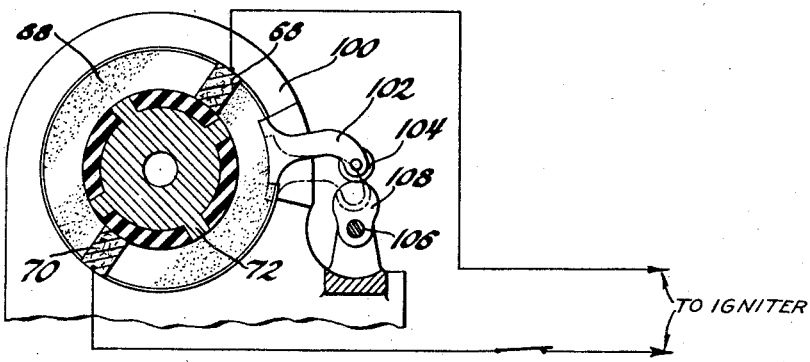
Figure 9 shows schematically a modified means for varying the position of the brushes for the phase shift control device.

Instead of having the half cycles go through a series of progressions of ascending or descending, almost any desired grouping may be obtained by using a cam control to shift the brushes 68 and 70 around the periphery of the commutator as the latter rotates. For example, it may be desirable to obtain a plurality of half cycles of increasing power, followed directly by a plurality of decreasing power. The construction shown in Figure 9 would provide for such control. In that instance the commutator 72 rotates within cylindrical means 88 which supports the two diametrically spaced brushes 68 and 70 which are herein shown connected directly to the supply lines inasmuch as the actual physical travel of the same is not excessive. If however the movement was such as to make impractical direct connection of the wires, slip rings could be used as previously disclosed.

Figure 10:
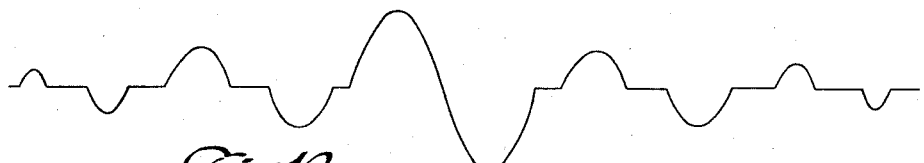
Figures 10, 11 and 12 show wave forms of current supplied to the load obtainable by this modified form.

From one side of the cylindrical member 88 which is supported for rotation in a housing 100 there extends a projecting arm 102 having a rotatable cam follower 104 on its tip. Also supported from the housing is a rotatable shaft 106 which carries a control cam 108 whose periphery is adapted to engage the roller 104 and force the same to different positions as the cam and shaft rotate. It is thus obvious that by determining the peripheral contour of the cam 108, the brushes 68 and 70 may be advanced or retarded at will and therefore cause the ignition circuit to be completed at predetermined times within the half cycle. By using a cam such as that shown at 108, the brushes may be gradually moved in the opposite direction from the rotation of the commutator 72 and thus gradually increase the power passed per half cycle as shown in the first half of Figure 10. However, when the roller 104 reaches the point shown in Figure 9, further rotation of the cam 108 will cause a clockwise motion of the brushes and assembly and therefore a gradual decrease in the amount of power passed per half cycle and Figure 10 will illustrate the currents passed by each half cycle for one rotation of the control cam. The cam shaft 106 will of course be driven in timed relation with the commutator so that the required synchronization is present.

Figure 11:
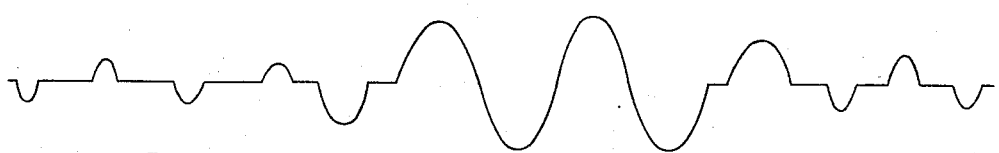
Figure 12:
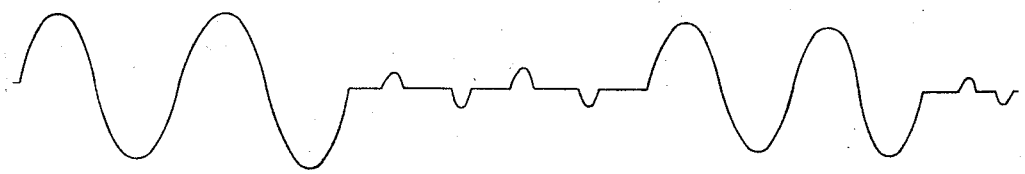

Figures 11 and 12 indicate other possibilities in which varying currents may be supplied depending upon the contour of the cams which are applied to the cam shafts 106 and it is seen therefrom that almost any desired size of current may be supplied to the welding electrodes.

I claim:

1. In circuit controlling means, power consuming means, alternating current power supply means, control means intermediate the consuming means and the supply means comprising a continuously moving switching means, a second continuously moving switching means cooperating with the first and moving at a different rate whereby relative motion will exist between the switching means and the duration of individual energizations of the power consuming means will vary.

2. In circuit controlling means, a source of alternating current electrical energy, a load, a pair of arc discharge devices connected in inverse relation between the source and the load, igniting means for the arc discharge devices and control means connected to the igniting means to progressively, periodically vary the instant of completion of the circuits including a continuously moving switching means, a second continuously moving switching means cooperating with the first and moving at a different rate of speed whereby relative motion exists between the two parts and means for connecting these switch parts to the ignition means for the arc discharge tubes.

3. In circuit controlling means, a source of alternating current electrical energy, a load, a pair of arc discharge devices connected in inverse relation between the source and the load, ignitiing means for the devices, a rotating commutator, a pair of brushes cooperating with the commutator and movable about the periphery thereof, means to move said brushes at a given rate different from the speed of the commutator and thus continuously vary the point of closing the circuit through the commutator and brushes and means to connect the brushes to the igniting means whereby the ignition of the devices will be controlled to follow a pattern.

4. In circuit controlling means, a source of alternating current electrical energy, a load, a pair of arc discharge devices connected in inverted relation between the source and the load, ignition electrodes in the devices to start the same conducting, a rotating commutator, a plurality of brushes therefor, rotatable supporting means for the brushes to permit them to rotate about the commutator, a common means for driving both the commutator and supporting means whereby the two will be synchronized and means for connecting the brushes to the source of energy and the igniting electrodes whereby the relative positions of the commutator and support will determine the firing instant of the devices and therefore the energy supplied therethrough to the load.

5. In circuit controlling means, a source of alternating current electrical energy, a load, a pair of arc discharge devices connected in inverse relation between the source and the load, ignition electrodes in the devices to start the same conducting, a rotating commutator, a plurality of brushes therefor, a support for the brushes capable of moving around the periphery of the commutator, timed synchronized means for moving the brush support and the commutator and means connecting the commutator and brushes to the igniting electrodes and the source of electrical energy whereby control of the firing of the arc discharge devices is provided.

6. In circuit controlling means, a source of alternating current electrical energy, a load, control means intermediate the load and the source of energy comprising a rotatble commutator, a brush holder and brushes movable about the periphery of the commutator, cam means for moving the brush holder and common means for driving the cam means and the commutator whereby the two will be synchronized.

7. In circuit controlling means, a source of alternating current electrical energy, a load, a pair of arc discharge devices connected in inverse relation between the source and the load, igniting electrodes for the arc discharge devices, a rotatable commutator, a brush holder rotatable around the commutator, brushes carried thereby in contact with the commutator, an arm projecting from the brush holder, an irregularly shaped cam cooperating with the arm to move the same, common means to drive the commuator and the cam and means interconnecting the brushes and the igniting electrodes and source of energy to control the firing of the devices.

KARL SARAFIAN.